United States Patent Office 3,076,802
Patented Feb. 5, 1963

3,076,802
20-[ω-(TERTIARY-AMINO)LOWER ALKANOYLAMI-DO] PREGN-5-EN-3β-OLS, ESTERS CORRESPONDING, AND INTERMEDIATES THERETO
Raymond E. Counsell, Skokie, Ill., assignor to G. D. Searle & Co., Chicago, Ill., a corporation of Delaware
No Drawing. Filed Dec. 1, 1961, Ser. No. 156,475
11 Claims. (Cl. 260—239.5)

The present invention is concerned with novel steroidal amino-amides of the pregnane series and, more particularly, with 20-[ω-(tertiary-amino)lower alkanoylamido] pregn-5-en-3β-ols and esters thereof, which are represented by the structural formula

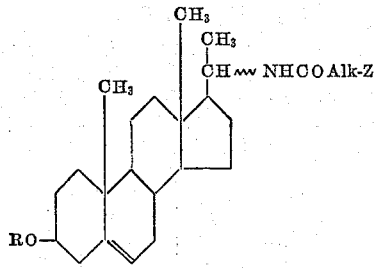

wherein R is hydrogen or a lower alkanoyl radical, Alk is a lower alkylene radical, Z is the residue of a secondary amine selected from the group consisting of di-(lower alkyl)amines, cycloalkylamines, morpholine, and N-alkyl-piperazines, and the wavy line indicates the alternative α or β configuration of the substituent at carbon atom 20.

The lower alkanoyl radicals encompassed by the R term are exemplified by formyl, acetyl, propionyl, butyryl, valeryl, caproyl, and the branched-chain isomers thereof, and the lower alkylene radicals represented by Alk are exemplified by methylene, ethylene, trimethylene, tetramethylene, pentamethylene, and the branched-chain radicals isomeric therewith.

Equivalent to the organic bases of this invention are the corresponding non-toxic salts, which are exemplified by the citrate, tartrate, maleate, ascorbate, gluconate, lactate, succinate, phosphate, sulfate, hydrobromide, and hydrochloride.

Starting materials suitable for the manufacture of the instant compounds are the 20-aminopregn-5-en-3β-ols and corresponding 3-esters. The 20-aminopregn-5-en-3β-ol 3-esters are allowed to react with a chloroalkanoyl chloride to afford the corresponding chloroalkanoylamido compounds. Treatment of these novel intermediates with the appropriate secondary amine results in the tertiary-amino)alkanoylamido 3-esters of this invention. These processes are specifically illustrated by the acylation of 20α-aminopregn-5-en-3β-ol 3-acetate with chloroacetyl chloride to yield the novel 20α-chloroacetamidopregn-5-en-3β-ol 3-acetate, which is treated with dimethylamine to produce 20α-(dimethylaminoacetamido)pregn-5-en-3β-ol 3-acetate. When the 20 - aminopregn-5-en-3β-ols are utilized as starting materials, two molecular equivalents of the chloroalkanoyl chloride are required, resulting in acylation of the 3-hydroxy group also. Treatment of these ester-amides with aqueous potassium hydroxide in dioxane results in preferential hydrolysis of the ester group to yield the chloroalkanoylamido substances, which are treated with a secondary amine, resutling in the instant (tertiary-amino)alkanoylamido-3-ols. The reaction of 20β-aminopregn-5-en-3β-ol, for example, with 2 molecular equivalents of chloroacetyl chloride affords the novel intermediate, 20β-(chloroacetamido)-pregn-5-en-3β-ol 3-chloroacetate, which yields 20β-(chloroacetamido)pregn-5-en-3β-ol upon hydrolysis with aqueous potassium hydroxide and dioxane. This chloroamide is allowed to react with dimethylamine in butanone to produce 20β-(dimethylaminoacetamido)pregn-5-en-3β-ol.

The instant 3β-hydroxy compounds can, alternatively, be obtained by hydrolysis of the corresponding 3-esters. Typically, 20α-(dimethylaminoacetamido)pregn-5-en-3β-ol 3-acetate is allowed to react with aqueous potassium hydroxide in dioxane to yield the free 3β-ol.

The 3β-(lower alkanoates) of this invention can be manufactured also by acylation of the corresponding 3β-ols, suitably by reaction with a lower alkanoic acid anhydride in pyridine. 20α - (dimethylaminoacetamido) pregn-5-en-3β-ol, for example, is treated with propionic anhydride and pyridine to afford the corresponding 3-propionate.

The compounds of this invention display valuable pharmacological properties. They are, for example, hypocholesterolemic agents as is evidenced by their ability to inhibit the hepatic synthesis of cholesterol. They are also antibiotic agents in view of their ability to inhibit the growth of *Chlorella vulgaris*. In addition, these compounds are intermediates in the manufacture of the N-substituted 20-aminopregn-5-en-3β-ols and corresponding esters of my copending application Serial No. 81,254, filed January 9, 1961, now Patent No. 3,013,008, of which the present application is a continuation-in-part.

The invention is disclosed in further detail by the following examples which represent specific embodiments of this invention, without, however, limiting it either in spirit or in scope. Amounts of materials are given in parts by weight and temperatures are given in degrees centrigrade (° C.).

Example 1

To a solution of 18 parts of 20α-aminopregn-5-en-3β-ol 3-acetate in 240 parts of benzene containing 7.3 parts of triethylamine is added dropwise a solution of 7.5 parts of chloroacetyl chloride in 20 parts of benzene, and this mixture is stirred and heated at reflux for about one hour, then cooled and filtered. The filter cake is washed with benzene, and the filtrate is washed successively with dilute hydrochloric acid, aqueous sodium bicarbonate, and water, dried over anhydrous sodium sulfate containing decolorizing carbon, and stripped of solvent at reduced pressure. The residue is crystallized from ethanol to yield 20α-(chloroacetamido)pregn-5-en-3β-ol 3-acetate, M.P. about 196–199°; [α]$_D$=—44°. This compound is represented by the structural formula

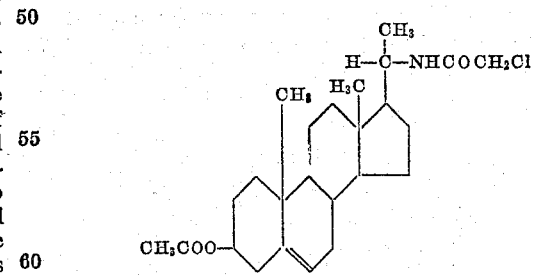

Example 2

The substitution of 15.9 parts of 20β-aminopregn-5-en-3β-ol and 16.9 parts of β-chloropropionyl chloride in the process of Example 1 results in 20β-(β-chloropropionylamido)-pregn-5-en-3β-ol 3-(β-chloropropionate).

Example 3

The reaction of 15.9 parts of 20β-aminopregn-5-en-3β-ol and 15.0 parts of chloroacetyl chloride by the process of Example 1 results in 20β-(chloroacetamide)pregn-5- en-3β-ol 3-chloroacetate, which is presented by the structural formula

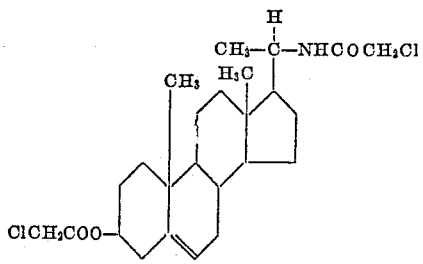

Example 4

To a solution of 49.8 parts of 20β-(β-chloropropionamido)pregn-5-en-3β-ol 3-(β-chloropropionate) in 250 parts of dioxane is added 6 parts of potassium hydroxide in 2 parts of water, and the mixture is stored at room temperature for about 16 hours, then is extracted with ether. The organic layer is washed with water, dried over anhydrous sodium sulfate, and stripped of solvent at reduced pressure. The residue is crystallized from ethyl acetate to produce 20β-(β-chloropropionamido)pregn-5-en-3β-ol.

Example 5

To a solution of 8.72 parts of 20α-(chloroacetamido)-pregn-5-en-3β-ol 3-acetate in 87 parts of toluene containing 20 parts of butanone is added a solution of 9 parts of dimethylamine in 26 parts of toluene, and this mixture is heated at 50–55° in a suitable sealed container for about 40 hours. The reaction mixture is cooled, washed with water, dried over anhydrous potassium carbonate containing decolorizing carbon, and evaporated to dryness at reduced pressure. The resulting residue is crystallized from heptane to produce 20α-(dimethylaminoacetamido)pregn-5-en-3β-ol 3-acetate, M.P. about 159–161.5°; [α]$_D$=—52.5°. This substance is represented by the structural formula

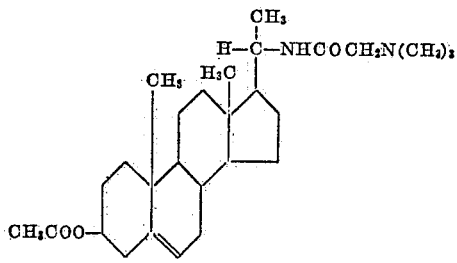

Example 6

The substitution of 43.2 parts of 20α-(dimethylaminoacetamido)pregn-5-en-3β-ol 3-acetate in the procedure of Example 4 results in 20α-(dimethylaminoacetamido)-pregn-5-en-3β-ol, M.P. about 188–189°, which is represented by the structural formula

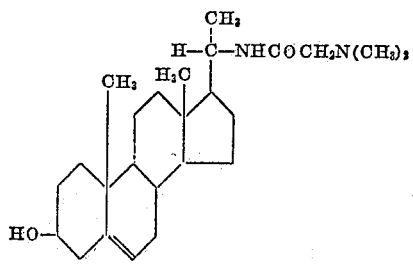

Example 7

A solution of 4.4 parts of 20α-(chloroacetamido)pregn-5-en-3β-ol 3-acetate and 1.7 parts of pyrrolidine in 44 parts of benzene is heated at reflux for about 20 hours, then is allowed to cool to room temperature and is diluted with ether. The organic mixture is washed with water, dried over anhydrous potassium carbonate containing decolorizing carbon, and evaporated to dryness in vacuo. The resulting crystalline residue is recrystallized from aqueous ethanol to yield pure 20α-(pyrrolidinoacetamido)pregn-5-en-3β-ol 3-acetate, M.P. about 157–160°, which is represented by the structural formula

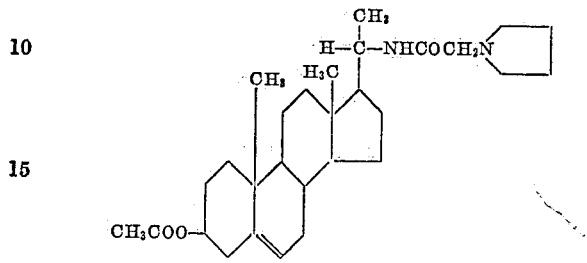

Example 8

By substituting 2.08 parts of morpholine and otherwise proceeding according to the processes of Example 7, 20α-(morpholinoacetamido)pregn-5-en-3β-ol 3-acetate, M.P. about 173–176°, is obtained. This compound is represented by the structural formula

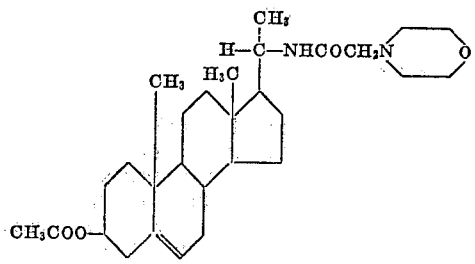

Example 9

The substitution of 2.39 parts of N-methylpiperazine in the procedure of Example 7 results in 20α[(N-methylpiperazino)acetamido]pregn-5-en-3β-ol 3-acetate, M.P. about 145–147°. It is represented by the structural formula

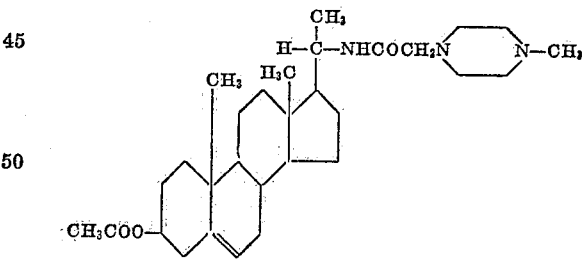

Example 10

The substitution of 2.04 parts of piperidine in the procedure of Example 7 produces a material, which is recrystallized from methanol to afford 20α-(piperidinoacetamido)pregn-5-en-3β-ol 3-acetate, M.P. about 171.5–172.5°. It is represented by the structural formula

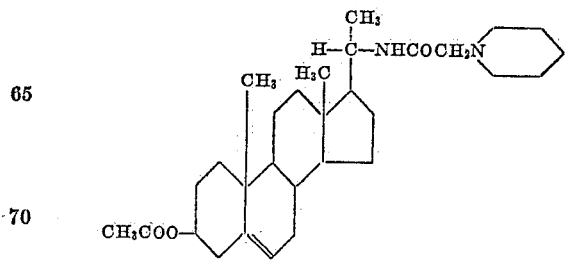

Example 11

A solution of 9 parts of 20α-(chloroacetamido)-pregn-5-en-3β-ol 3-acetate and 4.4 parts of diethylamine in 154 parts of benzene is heated at 50–55° in a suitable sealed container for about 48 hours. The cooled mixture is filtered, and the filtrate is evaporated to dryness in vacuo. Crystallization of the solid residue from aqueous methanol affords 20α-(diethylaminoacetamido)pregn-5-en-3β-ol 3-acetate, M.P. about 147–149°, which is represented by the structural formula

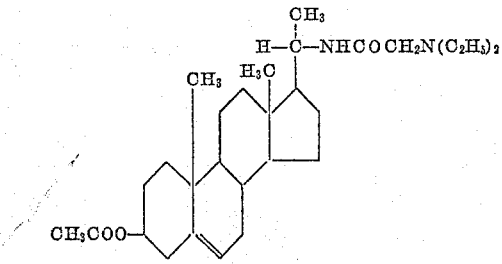

*Example 12*

The reaction of 8.1 parts of 20β-(β-chloropropionamido)pregn-5-en-3β-ol with 14.6 parts of diethylamine according to the procedure of Example 5 results in 20β-(β-diethylaminopropionamido)pregn-5-en-3β-ol, which is represented by the structural formula

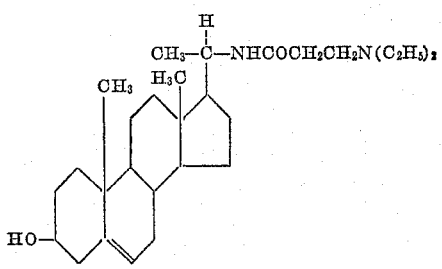

*Example 13*

A mixture of one part of 20β-(β-diethylaminopropionamido)pregn-5-en-3β-ol, 13 parts of propionic anhydride, and 20 parts of pyridine is kept at room temperature for about 16 hours, then is diluted with ice and water. The resulting aqueous mixture is made alkaline to pH 9 by the addition of sodium carbonate, then is extracted with benzene. This organic solution is washed with water, dried over anhydrous sodium sulfate, and concentrated to dryness to produce 20β-(β-diethylaminopropionamido)pregn-5-en-3β-ol 3-propionate. This compound is represented by the structural formula

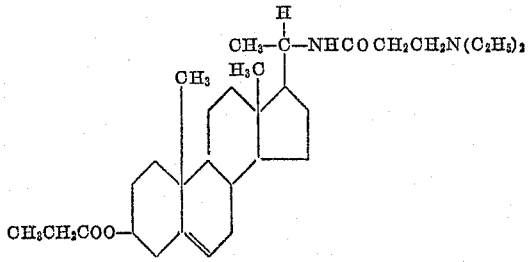

*Example 14*

By substituting one part of 20α-(dimethylaminoacetamido)pregn-5-en-3β-ol in the procedure of Example 13, 20α-(dimethylaminoacetamido)pregn-5-en-3β-ol 3-propionate is obtained. This compound is represented by the structural formula

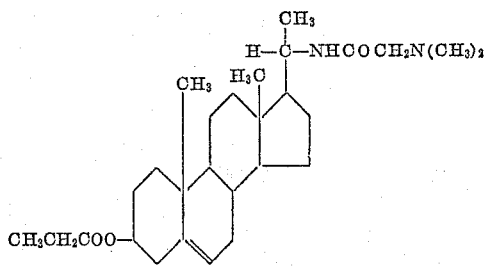

What is claimed is:
1. A compound of the structural formula

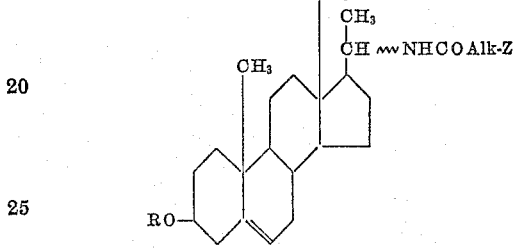

wherein R is selected from the group consisting of hydrogen and lower alkanoyl radicals, Alk is a lower alkylene radical, and Z is selected from the group consisting of di-(lower alkyl)amino radicals and radicals of the structural formula

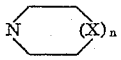

wherein X is selected from the group consisting of methylene, epoxy, and methylimino radicals, and n is selected from the group consisting of 0 and 1.

2. A compound of the structural formula

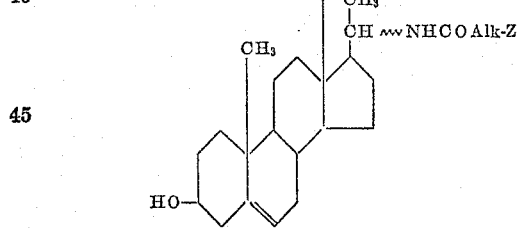

wherein Alk is a lower alkylene radical and Z is a di-(lower alkyl) amino radical.

3. 20α - pyrrolidinoacetamidopregn - 5-en-3β-ol 3-acetate.
4. 20α - morpholinoacetamidopregn - 5 - en - 3β - ol 3-acetate.
5. 20α - [(N-methylpiperazino)acetamido]pregn - 5-en-3β-ol 3-acetate.
6. 20α - piperidinoacetamidopregn - 5 - en - 3β - ol 3-acetate.
7. 20α - diethylaminoacetamidopregn - 5 - en - 3β - ol 3-acetate.
8. 20α-dimethylaminoacetamidopregn-5-en-3β-ol.
9. 20α - dimethylaminoacetamidopregn - 5 - en-3β-ol 3-acetate.
10. 20α-chloroacetamidopregn-5-en-3β-ol 3-acetate.
11. 20β-chloroacetamidopregn-5-en-3β-ol 3-chloroacetate.

No references cited.